(12) United States Patent
Miriyala

(10) Patent No.: US 7,069,027 B2
(45) Date of Patent: Jun. 27, 2006

(54) SILENT ZONE MUTING SYSTEM

(75) Inventor: Srinivas Miriyala, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 744 days.

(21) Appl. No.: 10/001,770

(22) Filed: Oct. 23, 2001

(65) Prior Publication Data

US 2003/0078080 A1    Apr. 24, 2003

(51) Int. Cl.
*H04Q 7/20* (2006.01)
*H04M 3/00* (2006.01)

(52) U.S. Cl. .............................. 455/456.4; 455/422.1; 455/418; 455/456.1; 455/456.3; 455/456.5; 455/456.6

(58) Field of Classification Search .............. 455/456.4, 455/422.1, 418, 456.1, 456.3, 456.5, 456.6, 455/565

See application file for complete search history.

(56) References Cited

U.S. PATENT DOCUMENTS

| | | | | |
|---|---|---|---|---|
| 6,011,973 A | * | 1/2000 | Valentine et al. | 455/456.6 |
| 6,085,096 A | * | 7/2000 | Nakamura | 455/456.6 |
| 6,438,385 B1 | * | 8/2002 | Heinonen et al. | 455/501 |
| 6,650,894 B1 | * | 11/2003 | Berstis et al. | 455/420 |
| 6,675,002 B1 | * | 1/2004 | Lipovski | 455/194.1 |
| 6,782,253 B1 | * | 8/2004 | Shteyn et al. | 455/414.1 |
| 6,813,501 B1 | * | 11/2004 | Kinnunen et al. | 455/456.2 |
| 6,832,093 B1 | * | 12/2004 | Ranta | 455/456.4 |

* cited by examiner

*Primary Examiner*—George Eng
*Assistant Examiner*—Un C. Cho
(74) *Attorney, Agent, or Firm*—Hisashi D. Watanabe

(57) ABSTRACT

A muting system (10) according to the present invention enables wireless communication devices (16,18) that enter a silent zone to generate a silent zone advisory message (64) and subsequently mute the wireless communication devices (16, 18). A muting device (14) remotely instructs the wireless communication devices (16, 18) to enter a silent mode. A digital information system (20) maintains muting status information that includes information such as the event description, location, and duration in a categorized formation. The digital information center (20) remotely communicates the muting status information to the wireless communication devices (16, 18) so that the wireless communication devices (16, 18) can generate a silent zone advisory message to communicate the status information to callers while the devices are muted.

8 Claims, 3 Drawing Sheets

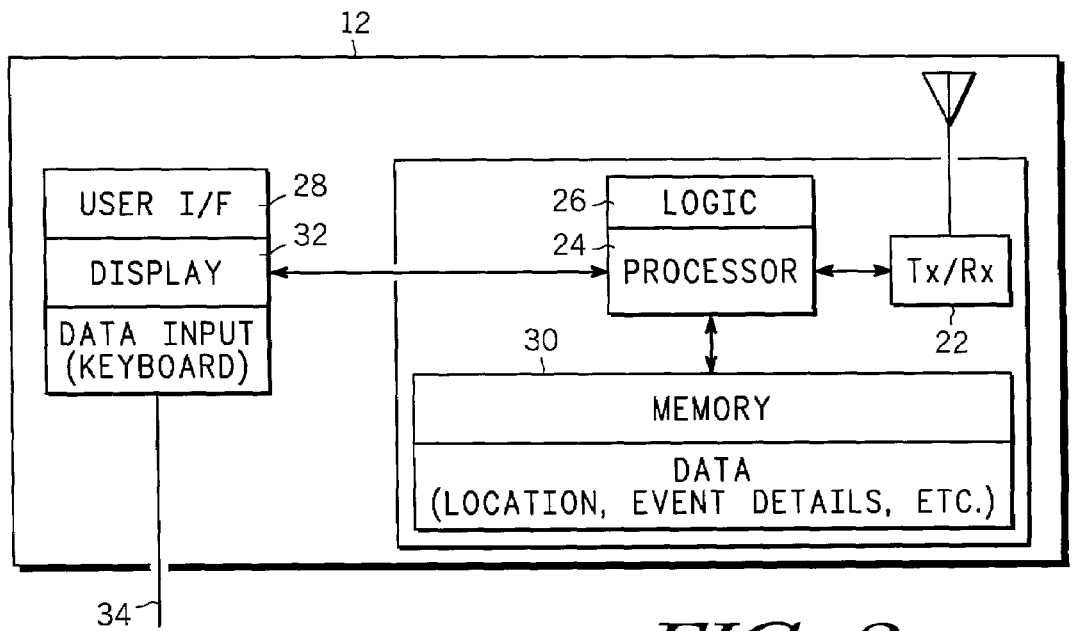
FIG. 2
FIG. 3
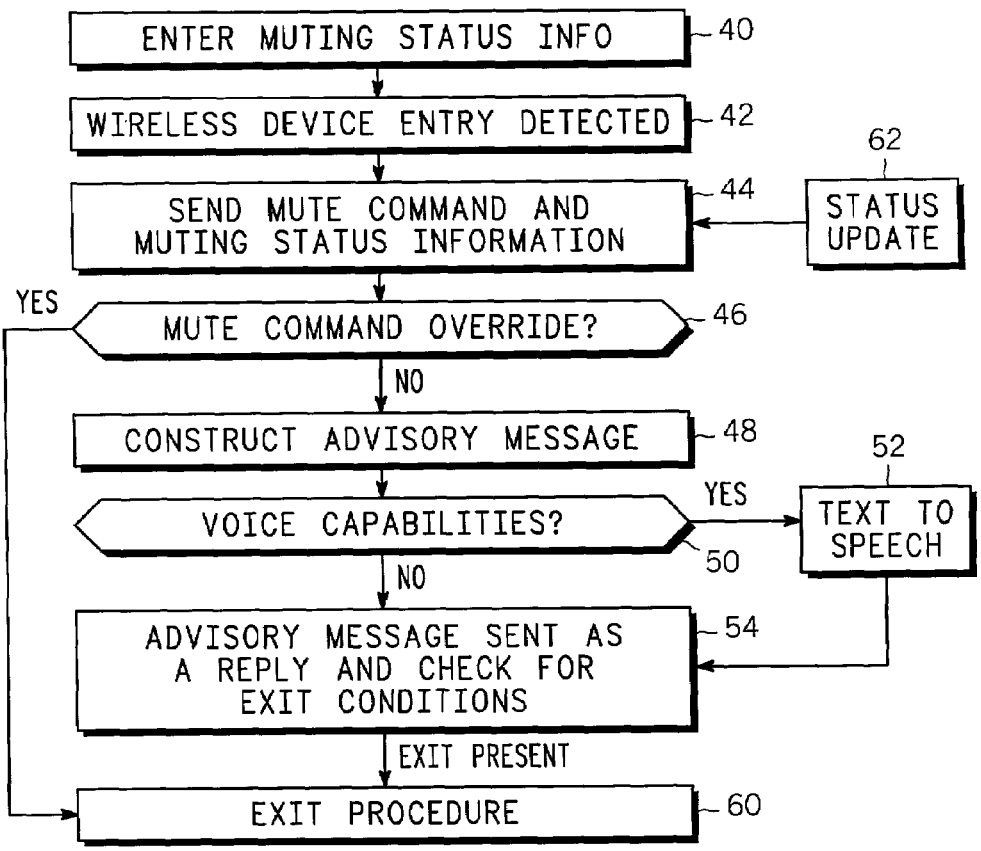

SILENT ZONE MUTING SYSTEM

FIELD OF THE INVENTION

This invention relates generally to systems for muting wireless communication devices and, more particularly, to a system for automatically muting a wireless communication device when the device enters a defined silent zone, and for automatically communicating muting status information to other devices attempting to communicate with the muted wireless communication device.

BACKGROUND OF THE INVENTION

Wireless communication devices such as cellular telephones and pagers permit individuals to communicate with one another virtually anywhere. When individuals carrying these types of devices enter certain locations known as silent zones, such as theaters or restaurants, common courtesy as well as numerous restrictions dictate that these wireless communication devices either be muted or turned off. However, users of these wireless communication devices may forget to mute or turn off these devices upon entering such a location. This can result in distracting other individuals at the location and can cause embarrassment to the particular individuals carrying such devices.

Consequently, low-power, short-range wireless communication technology used to automatically mute these wireless communication devices in silent zones has been contemplated. While this technology minimizes distractions for individuals in these locations, it creates certain drawbacks for both the individuals carrying the muted devices and for the individuals trying to call or page the individuals carrying the muted devices. Specifically, the muted wireless communication devices cannot communicate to a caller the reason why the devices are muted, the location of the muted devices or the duration of time for which the devices will remain muted. Therefore, callers may mistakenly assume that the individuals whom they are trying to contact are not within a coverage area, have turned their devices off for the remainder of the day, or are simply not answering the calls.

SUMMARY OF THE INVENTION

A silent zone muting system according to the present invention utilizes a short range, low power transceiver device, a muter and a digital information center to both mute a wireless communication device when the device enters a silent zone and to communicate information to the device. The muter automatically communicates a muting command to the wireless communication device in the silent zone that is defined by the short range, low power transceiver device. Muting status information is stored in the digital information center and is communicated in a categorized format to the wireless communication device. The muting status information may include, for example, event location, event description and event time duration. The wireless communication device can then communicate the muting status information as an automatic advisory message reply upon being contacted while muted. This automatic advisory message can be communicated as a voice or text message, depending on the capabilities of the wireless communication device.

Consequently, it is possible for a wireless communication device user to enter a silent zone and to have the device muted while at the same time advise other callers of the user's location, the time duration for which the user's wireless communication device will be muted or a description of the user's current venue.

BRIEF DESCRIPTION OF THE DRAWINGS

Additional objects and advantages of the present invention will be more readily apparent from the following detailed description of preferred embodiments thereof when taken together with the accompanying drawings in which:

FIG. 2 is a block diagram of the components of the silent zone muting system of FIG. 1;

FIG. 3 is a flow diagram of the process by which the silent zone muting system defines a silent zone and generates advisory message information.

DETAILED DESCRIPTION OF THE PREFERRED EMBODIMENTS

In overview form the present disclosure concerns systems suitable for effecting a silent zone for subscriber devices or equipment. As further discussed below various inventive principles and combinations thereof are advantageously employed to effect the muting or automatically arranging for different operational modes for subscriber devices while located within such a zone and notifying other callers of such a status provided these principles or equivalents are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items, or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Figure 1:
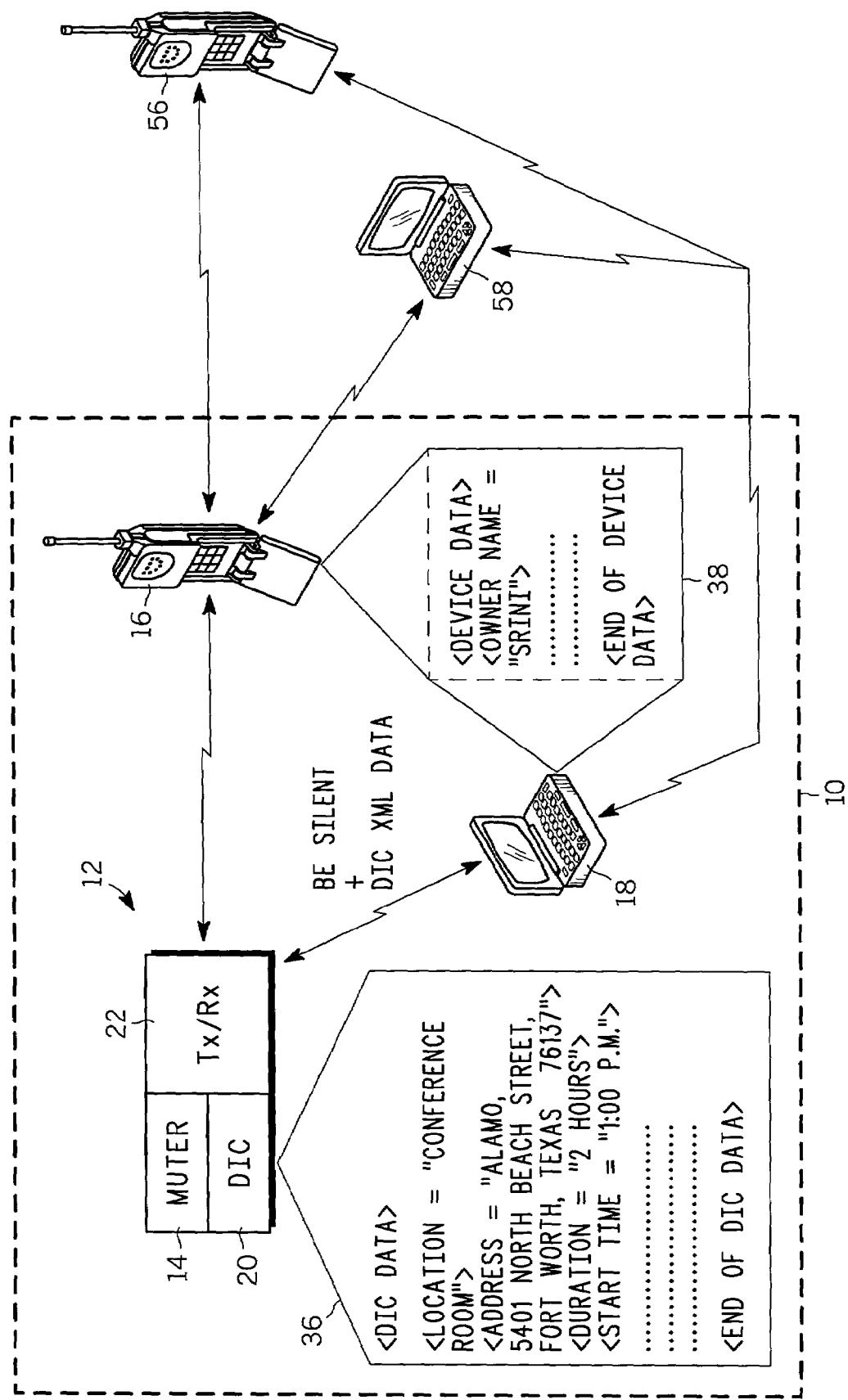
FIG. 1 is a system diagram of a silent zone muting system for defining silent zones in accordance with the present invention.

The present disclosure will discuss various embodiments in accordance with the invention. The system diagram of FIG. 1 will be used to lay the groundwork for a deeper understanding of the present invention and advantages thereof. FIG. 1 in large part and at the simplified level depicted is a representative diagram of a wireless communications system 10 and will serve to explain the problems and certain inventive solutions thereto according to the present invention.

Referring now to the drawings in which like reference numerals refer to like items, FIG. 1 shows the architecture of a silent zone muting system 10. The silent zone muting system 10 includes a command component 12, such as an ASIC or other type of program controller for generating and communicating muting commands and muting status information and defining the boundaries of a silent zone. The command component 12 is programmed to include a muter 14 for muting wireless communication devices 16, 18 within the silent zone, a digital information center (DIC) 20 for sending and storing muting status information and a short range, low power transceiver 22 for facilitating the transmission of muting status information and muting commands from the command component 12. The structure of each of the muter 14, DIC 20 and transceiver 22 will now be discussed in detail.

Referring to FIGS. 1 and 2, the muter 14 is programmed into a processor 24 by processor control logic 26 so that the processor 24 issues a mute command upon receiving a detection signal via the transceiver 22 indicating the presence of the wireless communication devices 16, 18 within the silent zone. The mute command, which is preferably a digital signal recognizable by the transceiver 22, is subsequently communicated to the wireless communication devices 16, 18 via the transceiver 22.

In addition to the processor 24, the DIC 20 includes a user interface 28 and a programmable memory 30. The user interface 28 includes a display 32 and a data input device 34 for inputting muting status information that will include, for example, the event description, duration of the event and location. The processor control logic 26 is programmed so that the processor 24 categorizes the muting status information after it is entered and stores it in the programmable memory 30 in a categorized format, such as extensible markup language (XML) format. The categorized format facilitates parsing of the muting status information by the wireless communication device being muted. For example, if a user named Mr. John Doe entered muting status information consisting of a location (Conference Room), an address (Alamo, 5401 North beach street), a city and state (Fort Worth, Tex. 76137), a time duration (2 hours) and a start time (1:00 P.M) into the processor 24 via the data input 34, the processor 24 would store this information as DIC data 36 in the programmable memory 30 categorized by Location, Address, Duration and Start Time XML-formatted categories as shown at FIG. 1 as categorized DIC data 36. However, other categorized formats such as HTML can be used.

The transceiver 22 is a short-range, low power device for facilitating a short-range radio link between wireless communication devices such as, for example, a transceiver utilizing Bluetooth™ or conventional infrared communications technology. The transceiver 22 communicates the muting command generated by the muter 14 and muting status information stored in the memory 30 to the wireless communication devices 16, 18 within the zone. Although the transceiver 22 is shown in FIGS. 1–2 as being a portion of the command component 12, the transceiver 22 can alternatively be a device that is separate from the command component 12.

The wireless communication devices 16, 18 may also contain categorized device data information 38 including the name of the owner of the wireless communication devices and situation details that are preprogrammed into the wireless communication devices' respective local memories (not shown) by the user. While it should be understood that the system architecture is capable of supporting various wireless communication devices, only a cellular telephone 16 and text pager 18 are shown for discussion purposes.

Figure 4:
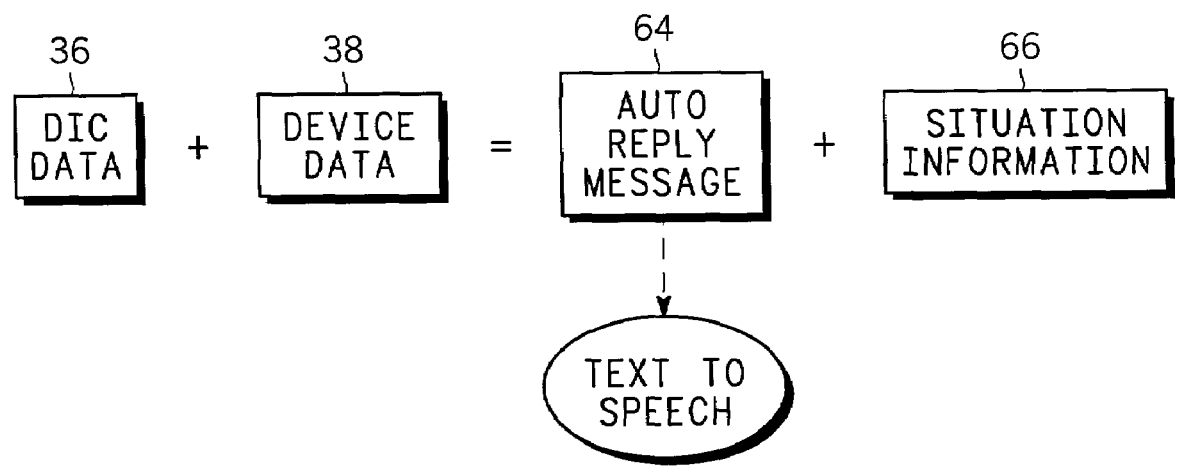
FIG. 4 is a flow diagram of the process by which the silent zone muting system of the present invention generates an advisory message.

Referring to FIGS. 3–4, operation of a preferred embodiment of the muting system 10 will now be discussed with respect to its use in maintaining a silent zone during a meeting.

Initially, at 40 the muting system 10 is configured with the muting status information that is entered into the DIC 20 via the user interface 28. The processor control logic 26 is programmed so that the processor 24 automatically formats the muting status information entered into a categorized format and stores it in the programmable memory 30. At 42, the transceiver 22 of the command component 12 is strategically placed in order to define the meeting location as a silent zone and to permit the muting command issued by the muter 14 to reach the wireless communication devices 16, 18 when individuals carrying the devices 16, 18 enter the meeting location. In order to achieve this object, the transceiver 22 could be placed, for example, above doorways leading to the meeting locations so that the wireless communication devices 16, 18 receive the muting command and enter a silent mode upon passing through the doorways. The location of the transceiver 22 will also be based upon device operating specifications such as effective transmission or reception range. When individuals with the wireless communication devices 16, 18 enter the silent zone, the transceiver 22 detects the presence of the wireless communication devices 16, 18 when the devices communicate respective detection signals to the processor 24. It is also possible that the system can push the information without needing to detect the presence of the devices in the silent zone. This can be achieved by setting up the system to periodically communicate the muting commands and the information stored in the memory 30 at a rate that will allow every device entering the doorway to receive the messages at least once. It should be noted that only the former approach is assumed through the rest of the document.

At 44, the muter 14 issues a muting command via the transceiver 22 to the wireless communication devices 16, 18. Also, the DIC 20 communicates the muting status information to the wireless communication devices 16, 18 via the transceiver 22. The processor control logic 26 or optional software is programmed so that the muting status information is automatically communicated in a categorized format to the wireless communication devices 16, 18 upon receiving the detection signal from the transceiver 22. The muting command encompasses, for example, a command that turns the wireless communication devices 16, 18 to their respective silent modes. The muter 14 can alternatively transmit a mute request to the wireless communications devices 16, 18 rather than issuing an automatic mute command. The subsequent operation of the wireless communication devices 16, 18 during the muted status will depend upon device specific features as described above.

The wireless communication devices 16, 18 process the muting status information it received by parsing through the different categories and storing it in their respective local memories (not shown). The users of the wireless communication devices 16, 18 can also view the information stored locally.

At 46, an override option can be elected. For example, the wireless communication devices 16, 18 may have an override identifier that is optionally automatically communicated to the DIC 20 in response to the mute command. As a result, any automatic muting done by the processor 24 with respect to particular wireless communication devices 16, 18 with the override identifier will be terminated or ignored as below explained. Alternatively, an override option could be presented to the users of the wireless communication devices 16, 18 after the devices receive the muting command. The users could subsequently choose to decline the muting command and maintain their wireless communication devices 16, 18 in a "normal" mode of operation. For example, if the individual carrying the wireless communication device 16 in the above example was a medical doctor on call, the wireless communication device 16 could contain an automatic override identifier that is communicated to the wireless link or an automatic override function. If the muting command were overridden, the muting would automatically terminate.

If the muting command is not overridden, at 48 an advisory reply message is constructed based upon the muting status information it received from the muting system and any additional information, such as a user name 38 preprogrammed into the wireless communication devices 16, 18. The user can also be given the option to make changes to the advisory reply message. For example, if the muting status information included the DIC data 36 mentioned in the above example discussing the categorized format in conjunction with the user name 38 preprogrammed into the wireless communication devices 16, 18, the advisory message would comprise a sentence such as: "Mr. John Doe is in the conference room at Alamo, 5401 North Beach Street, Fort Worth, Tex. 76137 and will be there from 1:00 pm to 3:00 pm." Mr. John Doe could choose to delete the address of the conference room and only include the time duration in the advisory message.

At 50 the capabilities of the wireless communication devices 16, 18 are evaluated based upon wireless communication device specific parameters. If the wireless communication devices 16, 18 have voice mail capabilities, such as the cellular phone 16, the system proceeds to 52 where a voice advisory reply message is constructed by utilizing text to speech capabilities. Text communication devices, such as the text pager 18, receive a text advisory message. This process for evaluating the device capabilities can be performed by the wireless communication devices 16,18.

At 54, callers 56, 58 to the respective wireless communication devices 16, 18 receive advisory reply messages while the wireless communication devices 16, 18 are in the silent zone. Note that the form of the advisory message, for example text or voice, may depend on the caller or calling device capability in addition to the wireless communications device capability. For instance a cellular or PCS device may be able to receive text messages from a 2-way pager or messaging device and would need to respond with a text form of advisory message. The wireless communication devices 16, 18 in the system 10 will transmit advisory messages to callers attempting to reach the individuals carrying the wireless communication devices 16, 18 until an exit condition is detected.

Numerous exit conditions can be specified. For example, an exit condition could be the expiration of a time period specified in the muting status information received from the muting system. Either the DIC 20 or the wireless communication devices 16, 18 can determine if such an exit condition exists. When the time period expires, the exit procedure can automatically be initiated. With respect to the above example with Mr. John Doe, the exit condition would be detected at 3:00 pm. Also, the exit condition could be a manual override given by the user or a signal from the transceiver 22 detecting the exit of the user carrying the wireless communication device 16 from the silent zone.

At 60, the wireless communication devices 16, 18 are unmuted. The muter 14 issues an unmute command that is communicated to the wireless communication devices 16, 18 in a similar manner as the muting command. The wireless communication devices 16, 18 are either automatically unmuted or the users are reminded to return the devices 16, 18 to normal mode.

The above procedure for operating the muting system can also be initialized if status update muting information is entered into the DIC 20 via the user interface 28 at 62. For example, if the meeting is going to last longer than anticipated, the muting status information could be updated to reflect the new time duration. As a result, the advisory message in the wireless communication devices 16, 18 would also be updated.

The process by which the wireless communication devices 16, 18, construct an advisory reply message 64 is shown in FIG. 4. The muting status information stored in the DIC programmable memory 30 as DIC data 36 and communicated by the transceiver 22 to the wireless communication devices 16, 18 is combined with the wireless communication device specific device data 38 preprogrammed into the wireless communication devices 16, 18. The auto reply advisory message 62 preferably includes a combination of the data from these two sources. Additionally, the user can add any special situation information 66 to the message 64. For example, the user might want to add: "I am in a meeting." in addition to the meeting location and duration data. If the wireless communication device has voice capability, the text is changed to speech.

The silent zone system 10 of the present invention has applications beyond merely sending advisory messages to callers. For example, the wireless communication devices 16, 18 could alternatively be utilized as personal location devices while within the silent zone. For example, if a meeting attendee in a silent zone in accordance with the present invention wanted to order a pizza, she would only have to query the local memory of her wireless communication devices to find the address of the meeting and communicate this information to the pizza delivery service.

While the above description is of the preferred embodiment of the present invention, it should be appreciated that the invention may be modified, altered, or varied without deviating from the scope and fair meaning of the following claims.

The invention claimed is:

1. A wireless communication device of a silent zone system comprising:
   a transceiver configured to receive a mute command and a muting status information in response to the wireless communication device entering a silent zone;
   a programmable memory for storing device data associated with the wireless communication device; and
   a processor configured to activate a silent mode of the wireless communication device in response to the mute command and provide notification of a status of the wireless communication device through an advisory message to another device attempting to communicate with the wireless communication device, wherein the advisory message includes the muting status information received by the transceiver and the device data stored by the programmable memory.

2. The silent zone system of claim 1, wherein the muting status information includes an event location or event time duration.

3. The silent zone system of claim 1, wherein the muting status information includes an event description.

4. The silent zone system of claim 1, wherein the muting status information is communicated to the wireless communication device based on device specific parameters.

5. The silent zone system of claim 4, wherein the device specific parameters include voice or text communicating capability.

6. The silent zone system of claim 1, wherein the advisory message is constructed by combining the muting status information received by the transceiver and the device data stored by the programmable memory.

7. A method of a wireless communication device for implementing a silent zone, comprising:

storing device data associated with the wireless communication device;

receiving a mute command and a muting status information in response to entering a specific zone in which communication devices are muted; and activating a silent mode of the wireless communication device in response to the mute command and providing notification of a status of the wireless communication device through an advisory message, which includes the muting status information and the device data, to another device attempting to communicate with the wireless communication device.

8. The method of claim 7, wherein activating a silent mode of the wireless communication device includes constructing the advisory message by combining the muting status information and the device data.

\* \* \* \* \*